(12) United States Patent
Aburmad

(10) Patent No.: US 9,188,772 B2
(45) Date of Patent: Nov. 17, 2015

(54) OPTICAL INSTRUMENT

(75) Inventor: Shimon Aburmad, Nahariya (IL)

(73) Assignee: OPGAL OPTRONIC INDUSTRIES LTD., Karmiel (IL)

(*) Notice: Subject to any disclaimer, the term of this patent is extended or adjusted under 35 U.S.C. 154(b) by 334 days.

(21) Appl. No.: 13/578,122

(22) PCT Filed: Feb. 9, 2011

(86) PCT No.: PCT/IB2011/050550
§ 371 (c)(1),
(2), (4) Date: Aug. 9, 2012

(87) PCT Pub. No.: WO2011/098960
PCT Pub. Date: Aug. 18, 2011

(65) Prior Publication Data
US 2012/0314282 A1    Dec. 13, 2012

(30) Foreign Application Priority Data

Feb. 10, 2010   (IL) .......................................... 203876

(51) Int. Cl.
*G02B 23/04* (2006.01)
*G02B 13/14* (2006.01)
*G02B 17/08* (2006.01)
*G02B 23/12* (2006.01)

(52) U.S. Cl.
CPC ............ *G02B 23/04* (2013.01); *G02B 13/14* (2013.01); *G02B 17/0896* (2013.01); *G02B 23/12* (2013.01)

(58) Field of Classification Search
USPC .................. 359/364, 634, 636, 733
See application file for complete search history.

(56) References Cited

U.S. PATENT DOCUMENTS

| | | | | |
|---|---|---|---|---|
| 2,508,764 | A * | 5/1950 | Miller | 359/636 |
| 3,672,782 | A * | 6/1972 | Akin | 356/251 |
| 5,329,347 | A | 7/1994 | Wallace et al. | |
| 5,717,518 | A * | 2/1998 | Shafer et al. | 359/357 |
| 7,408,703 | B2 * | 8/2008 | Matsuki et al. | 359/365 |
| 7,457,034 | B2 * | 11/2008 | Chuang et al. | 359/364 |

FOREIGN PATENT DOCUMENTS

| | | |
|---|---|---|
| GB | 1513314 | 6/1978 |
| WO | 9711399 | 3/1997 |

OTHER PUBLICATIONS

International Search Report for PCT patent application No. PCT/IB2011/050550, dated May 9, 2011.
Written Opinion for PCT patent application No. PCT/IB2011/050550, dated May 9, 2011.

* cited by examiner

*Primary Examiner* — Frank Font
(74) *Attorney, Agent, or Firm* — Pearl Cohen Zedek Latzer Baratz LLP

(57) ABSTRACT

An optical instrument that includes: an objective lens having an outer convex surface, an inner concave surface, a center, a first optical axis, and a bore cut substantially though the center; a set of objective lenses positioned within the bore and along the first optical axis; a first reflective element disposed along the first optical axis, within a first distance from the convex surface and tilted at a first tilt angle, the first reflective element configured to reflect rays incident along the first optical axis onto a second optical axis; and a second reflective element disposed along the second optical axis and within a second distance from the concave surface, wherein the first tilt angle is selected such that the first and the second distances are minimized.

16 Claims, 5 Drawing Sheets (EXISTING ART)

OPTICAL INSTRUMENT

BACKGROUND

1. Technical Field

The present invention relates to optical instruments and more particularly, to optical instruments exhibiting at least two optical paths.

2. Discussion of the Related Art

Optical instruments that comprise an objective lens with a bore cut substantially through its center are known in the art. The bore is usually used to accommodate optical and other elements that may be used to establish an alternative optical path other than the optical path associated with the objective lens.

FIG. 1 shows an optical instrument enabling two optical paths that share a common optical axis, according to an exemplary embodiment of the existing art. Optical instrument 10 comprises an objective lens 11 and a set of objective lenses 12 located within a bore cut through substantially the center of objective lens 11 such that the elements of set of objective lenses 12 are located substantially along the optical axis of objective lens 11. Rays coming through objective lens 11 pass through diverging lens 14 and converging lens 15 both located along the optical axis of objective lens 11 and configured, in combination, to produce a first image at plane 16.

Optical instrument 10 further comprises a first reflective element 13 located along the optical axis of objective lens 11 and tilted at an angle being approximately 45° such that rays coming through set of objective lenses 12 are folded onto an optical axis that is substantially perpendicular to the optical axis of objective lens 11. First reflective element 13 may be physically attached, via support elements (not shown) to a housing (not shown) that accommodates the optical elements of optical instrument 10. The support elements are required since set of objective lenses 12 usually extend further into optical instrument 10 beyond objective lens 11.

A second reflective element 17 is positioned along the optical axis of the folded rays and tilted at an angle being approximately 45° such that the folded rays are folded again onto an optical axis that is substantially parallel to the optical axis of objective lens 11. A set of lens 18 is located along the optical axis of the rays folded by second reflective element 17. The lenses of set of lens 18 are configured to create a second image at plane 19.

BRIEF SUMMARY

One aspect of the invention provides an optical instrument that includes a focusing objective lens having a first optical axis and a center bore; a first set of objective lenses disposed downstream of the objective lens, along the first optical axis, and partially in the bore; a first reflective element disposed downstream of the first set of lenses, on the first optical axis, partially in the channel, within a first distance from the objective lens, and at a tilt angle relative to the first optical axis, the first reflective element configured to reflect rays from the objective lens away from the first optical axis; a pair of lenses downstream of the objective lens and on the optical axis, the pair of lenses directing unreflected rays from the objective lens to a first image plane; a second reflective element that reflects the reflected rays along a second optical axis to a second image plane, wherein the first reflective element is closer to the objective lens than the second reflective element.

Another aspect of the invention provides an optical instrument that includes: an objective lens having an outer convex surface, an inner concave surface, a center, a first optical axis, and a bore cut substantially though the center; a set of objective lenses positioned within the bore and along the first optical axis; a first reflective element disposed along the first optical axis, within a first distance from the convex surface and tilted at a first tilt angle, the first reflective element configured to reflect rays incident along the first optical axis onto a second optical axis; and a second reflective element disposed along the second optical axis and within a second distance from the concave surface, wherein the first tilt angle is selected such that the first and the second distances are minimized.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 3A-5A show schematic diagrams illustrating aspects regarding to optical ray paths according to some embodiments of the present inventions; and FIGS. 3B-5B show Modulation Transfer Function (MTF) charts corresponding to FIGS. 3A-5A, illustrating aspects regarding the optical properties of the optical instrument according to some embodiments of the present invention.

Figure 1:
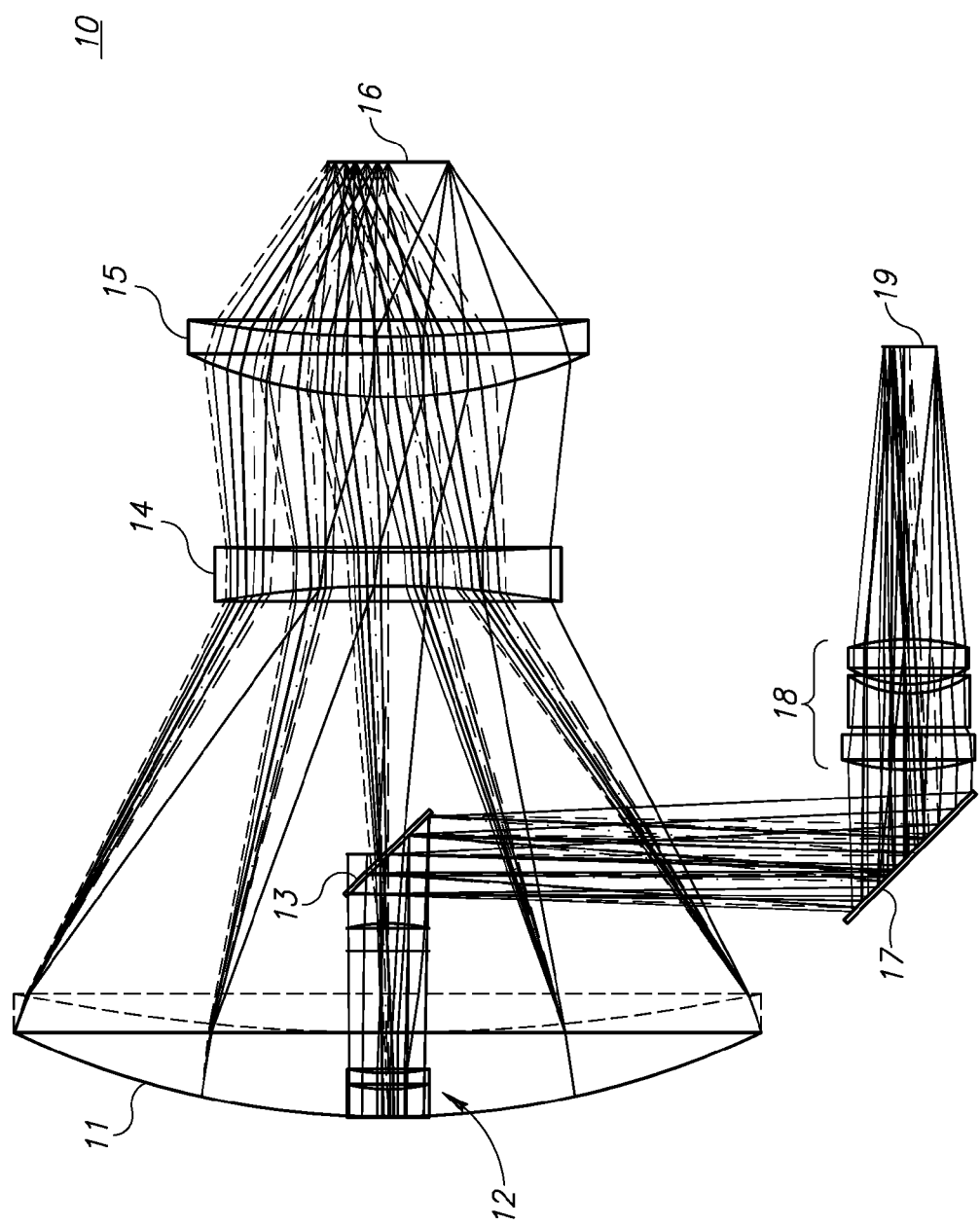
FIG. 1 is a schematic diagram illustrating an optical instrument according to the existing art.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "Optical Transfer Function" (OTF) as used herein in this application refers to the spatial (angular) variation as a function of spatial (angular) frequency. When the image is projected onto a flat plane, such as photographic film or a solid state detector, spatial frequency is the preferred domain, but when the image is referred to the lens alone, angular frequency is preferred.

The term "Modulation Transfer Function" (MTF) as used herein in this application refers to the magnitude component of the OTF. MTF charts showing Sagittal vs. Meridional lines are usually used as a qualitative criterion in assessing performance of optical instruments.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2:
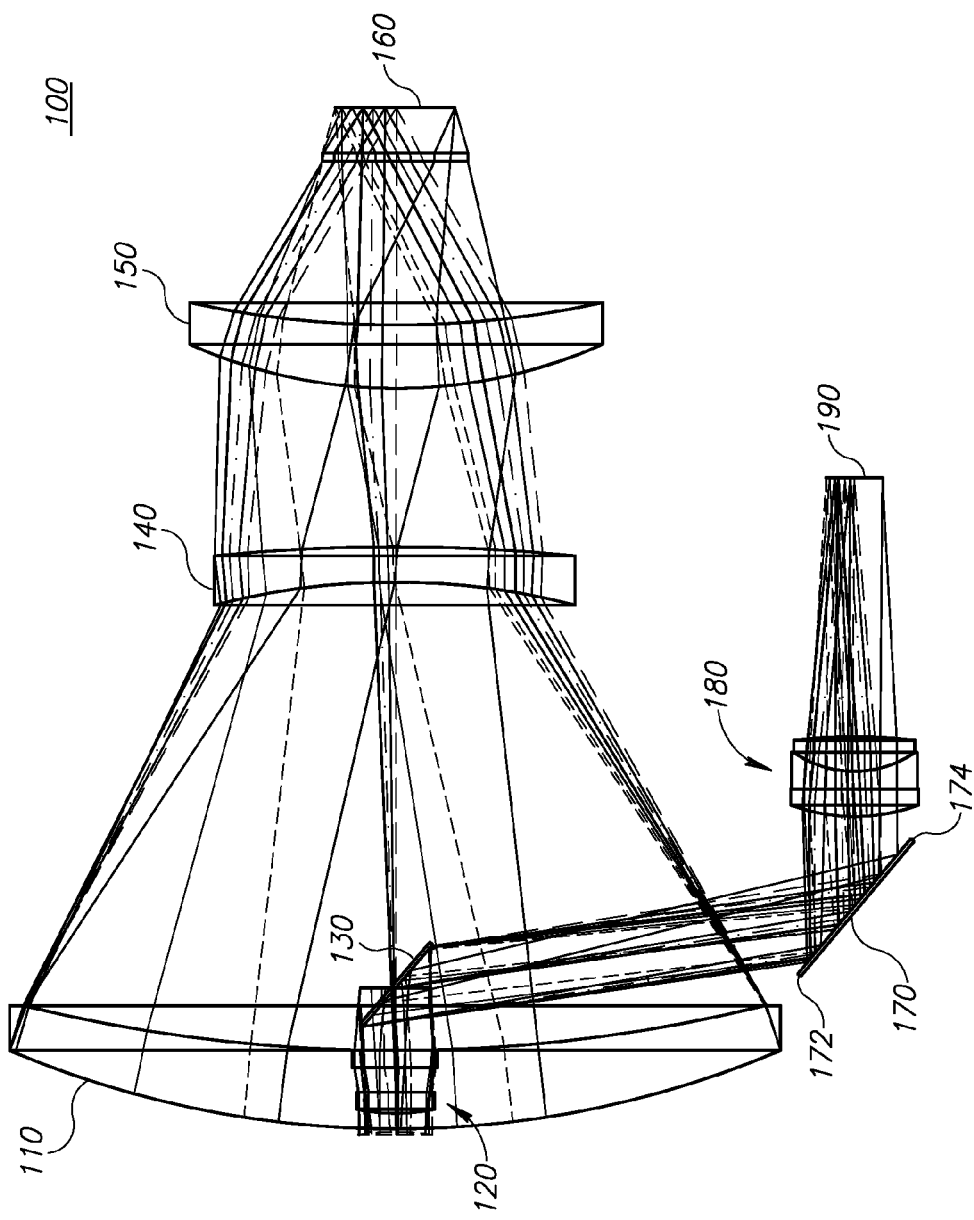
FIG. 2 is a schematic diagram illustrating an improved optical instrument according to some embodiments of the present invention.

FIG. 2 shows an improved optical instrument enabling two optical paths that share a common optical axis, according to some embodiments of the present invention. Improved optical instrument 100 comprises an objective lens 110 having an outer convex surface and an inner concave surface. A set of optical elements such as objective lenses 120 is located within a bore cut through substantially the center of objective lens 110 such that the elements of set of objective lenses 120 are located substantially along the optical axis of objective lens 110. Rays coming through objective lens 110 pass through diverging lens 140 and converging lens 150 both located along the optical axis of objective lens 110 and configured, in combination, to produce a first real image over plane 160.

Improved optical instrument 100 further comprises a first reflective element 130 located along the optical axis of objective lens 110. First reflective element 130 is located at a specified first distance from the convex surface of objective lens 110 and tilted at a specified first tilt angle (noted as α) such that rays coming through set of objective lenses 120 are folded onto a second optical axis.

A second reflective element 170 is positioned along the second optical axis and within a specified second distance from the concave surface of objective lens 110. Second reflective element 170 is tilted at a specified second tilt angle that is selected such that the rays along the second optical axis are folded again onto an optical axis that is substantially parallel to the optical axis of objective lens 110.

The specified first tilt angle is selected such that the specified first distance and the specified second distance are each minimized. In other words, first reflective element 130 is located as close as possible to the convex (outer) surface of objective lens 110. First reflective element 130 may be partially located within the channel cut through the center of objective lens 110 and physically connected to the inner side of set of objective lenses 120. Similarly, second reflective element 170 is located as close as possible to the concave (inner) surface of objective lens 110.

Consistent with embodiments of the present invention, some or all lenses and optical elements may be selected to pass all ranges of wavelengths so that applications for, for example, infra red and visible light (and other wavelengths) may be easily implemented by the improved optical arrangement.

According to some embodiments, in order to achieve minimizing of both first and second distances, first tilt angle α is optimally selected. The inventor has discovered that by selecting tilt angle α to be greater than 45° and smaller than 55°, a minimization of both first and second distances may be achieved. This range may vary in accordance with the optical properties of objective lens 110 such as the level of concavity and convexity thereof.

In some embodiments, as will be shown hereinafter, for a specified level of concavity, it has been discovered that a tilt angle α of approximately 50° yields the optimal results in terms of MTF.

Figure 3A:
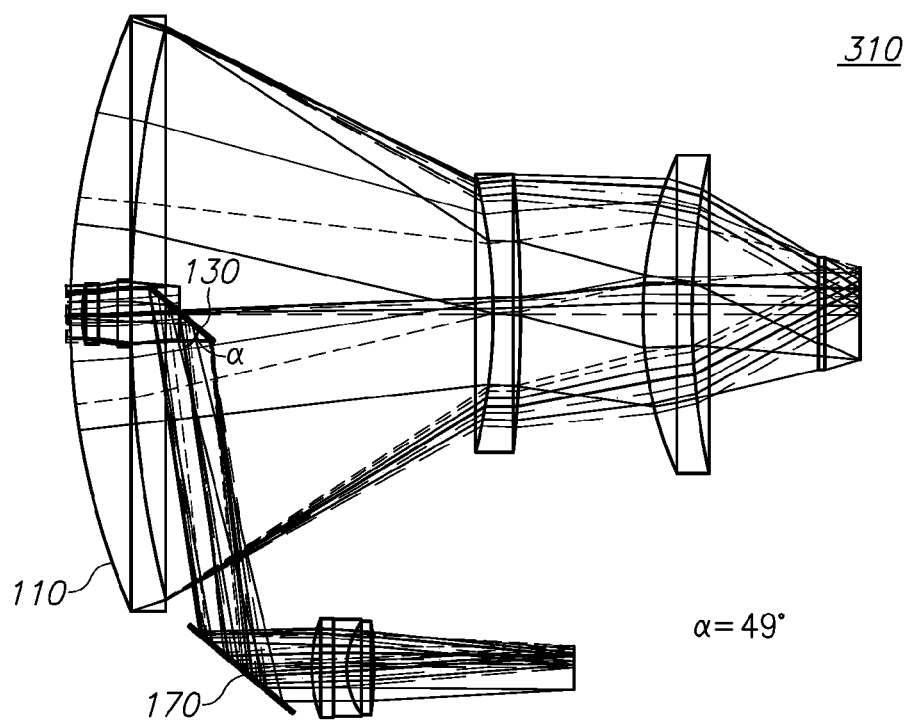
Figure 3B:
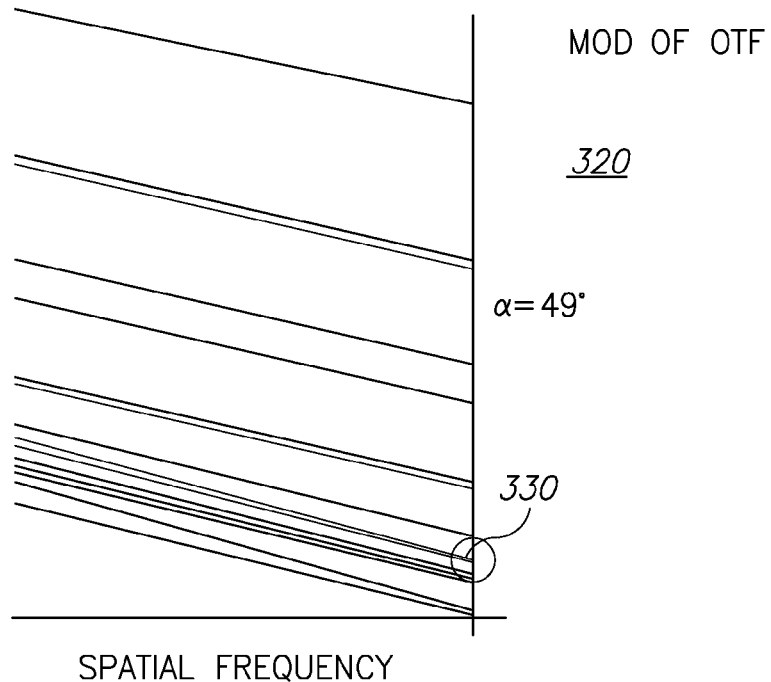
Figure 4A:
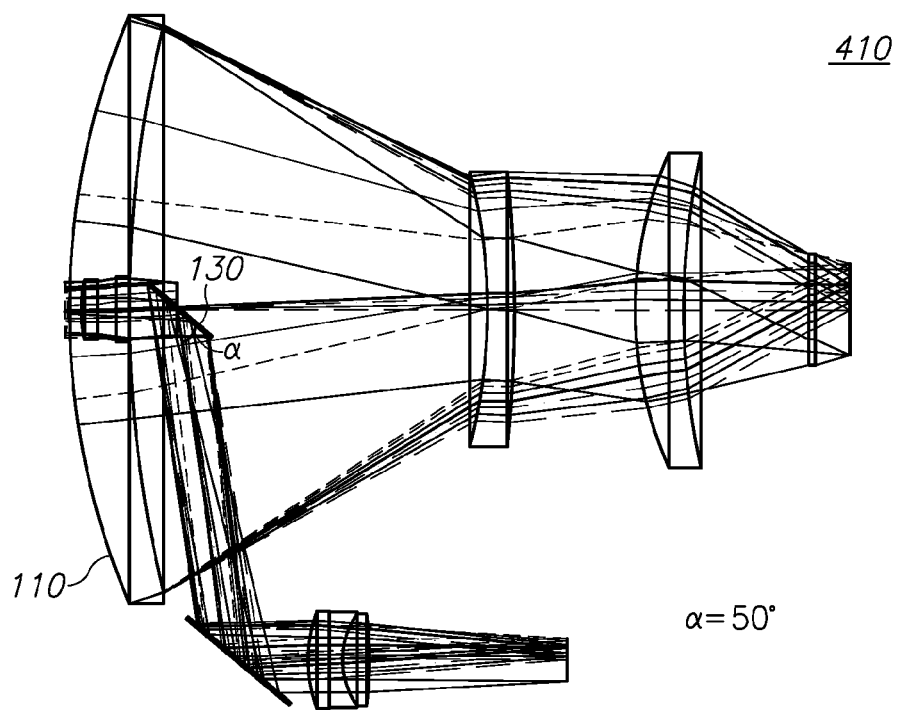
Figure 4B:
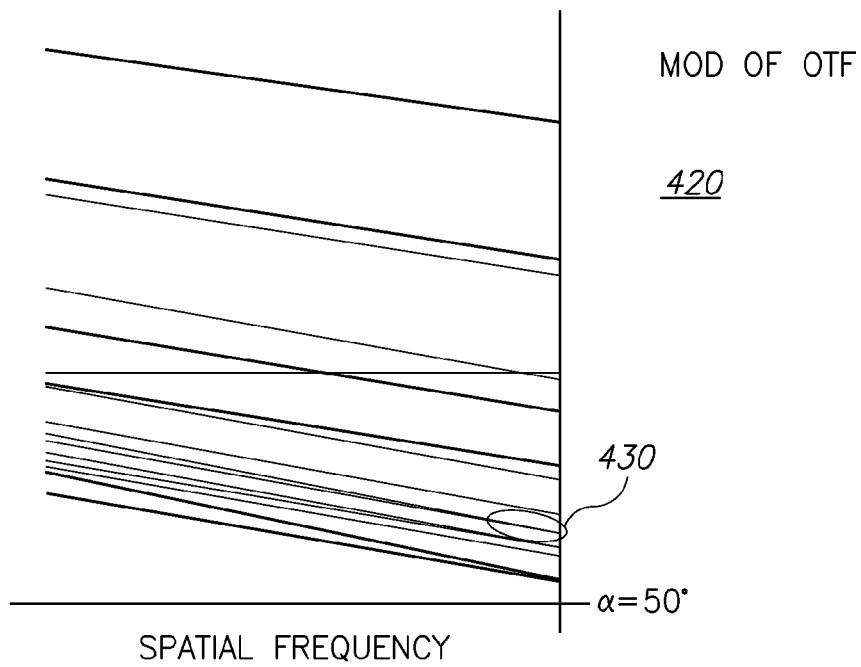
Figure 5A:
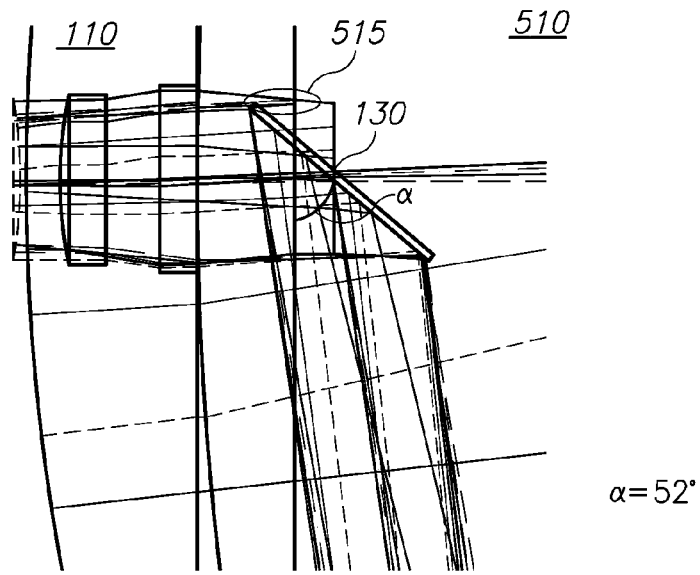

FIGS. 3A-5A show aspects relating to improved optical instrument 100 in several design options. Specifically, FIGS. 3A, 4A, and 5A show optical instrument 100 with tilt angle α being 49°, 50°, and 52° respectively. The physical arrangement of the optical elements in FIGS. 3A, 4A, and 5A is shown vis à vis the respective MTF charts illustrating Sagittal vs. Meridional lines for the selected tilt angle α.

In FIG. 3A a physical arrangement 310 in which tilt angle α is 49°, is shown. Second reflective element 170 is located very near to objective lens 110. The second distance may be optically sufficient to establish the second optical path. However, from a mechanical point of view, it would be advantageous to have a larger distance from objective lens 110 to enable physical support for second reflective element 170. In FIG. 3B a respective MTF chart 320 is shown. As seen in, for example, region 330 on the chart, the Sagittal and Meridional lines drift apart.

In FIG. 4A a physical arrangement 410 in which tilt angle α is 50°, is shown. Second reflective element 170 is located very near to objective lens 110 but is positioned well apart in order to enable physical support for second reflective element 170. In FIG. 4B a respective MTF chart 420 is shown. As seen in, for example, region 430 on the chart, the Sagittal and Meridional lines coincide.

Figure 5B:
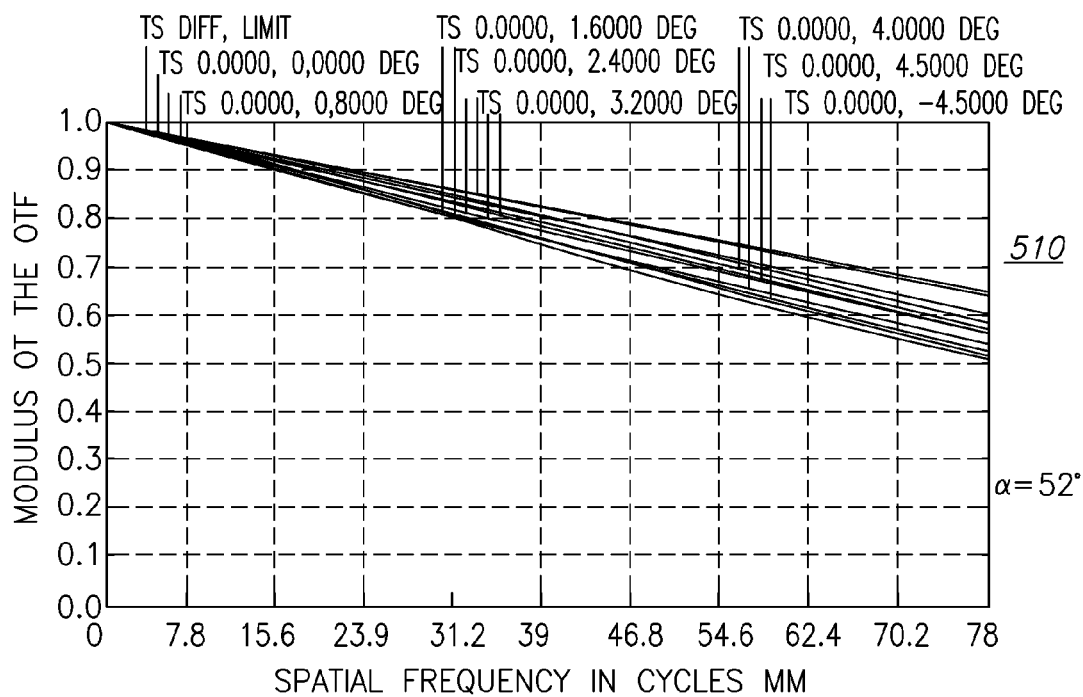

In FIG. 5A a physical arrangement 510 in which tilt angle α is 52°, is shown. First reflective element 130 is located such that its upper end no longer overlaps the incoming rays from set of objective lenses 120 within the bore. This causes some rays, for example, in region 515, to proceed along the first optical axis rather than along the second (folded) optical axis. This leads to an inferior MTF as illustrated in FIG. 5B by chart 520.

Returning now to the physical arrangement of the elements of improved optical instrument 100 in FIG. 2, according to some embodiments of the invention, a set of lens 180 may be located along the optical axis of the rays folded by second reflective element 170. The lenses of set of lens 180 are configured to create a second real image at plane 190. Each of real images at planes 160 and 190 may be passed through distinct optical modules (not shown) such that each respective optical module is configured to operate at a different wavelength range. For example, the image at plane 160 may be arranged to be processed by an infra-red sensor (not shown here) wherein the image at plane 190 may be arranged to be processed by a visible light sensor (not shown here).

According to some embodiments of the invention, both processed images of plane 160 and 190 respectively, may be combined and fused into a single image exhibiting information derived from both wavelength ranges. The combined imaged may be useable in night vision instruments and the like. Due to the common optical axis of the incoming rays passing through objective lens 110 and set of objective lenses 120 some optical issues, such as parallax, are avoided.

Advantageously, positioning first reflective element 130 as close as possible to the convex surface of objective lens 110 enables using a first reflective element 130 having a smaller area than would be required if first reflective element 130 is located farther from objective element 110 along the first optical axis. A first reflective element 130 having a smaller area may significantly improve the modulation transfer function (MTF) of optical instrument 100, as illustrated above.

Further advantageously, positioning first reflective element 130 as close as possible to the convex surface of objective lens 110 eliminates the use of support elements as used in optical instrument 10 of the existing art. The elimination of the support elements provides a stronger structure and further eliminates the pattern shade (which leads to a pattern noise that is difficult to handle) that may have been created upon plane 160 as is the case with plane 16 of optical instrument 10 of the existing art.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention.

What is claimed is:

1. An optical instrument comprising:
   an objective lens having an outer convex surface, an inner concave surface, a center, a first optical axis, and a bore cut substantially though the center;
   a set of at least one additional objective lens positioned within the bore and along the first optical axis;
   a first reflective element disposed along the first optical axis, within a first distance from the inner side of the convex surface such that the first reflective element is at least partially disposed within the concavity of the inner concave surface and tilted at a first tilt angle relative to the first optical axis such that rays coming through the set of at least one additional objective lenses are folded onto a second optical axis, the first reflective element configured to reflect rays incident along the first optical axis onto the second optical axis; and
   a second reflective element disposed along the second optical axis and within a second distance from the concave surface,
   wherein the first tilt angle is selected such that the first and the second distances are minimized.

2. The optical instrument according to claim 1, wherein the objective lens and the set of objective lenses are selected such that respective images obtained from the objective lens and the set of objective lenses each have a different wavelength range and are combinable into a single image exhibiting data derived from the different wavelength ranges.

3. The optical instrument according to claim 1, wherein the first reflective element is located partially within the bore.

4. The optical instrument according to claim 1, wherein the first tilt angle is greater than 45° and smaller than 55°.

5. The optical instrument according to claim 1, wherein the first tilt angle is approximately 50°.

6. The optical instrument according to claim 1, wherein the first tilt angle is further selected such that the second distance is minimized while sufficient for physical support for the second reflective element.

7. An optical instrument comprising:
   an objective lens having an outer convex surface, an inner concave surface, a center, a first optical axis, and a bore cut substantially though the center;
   a set of at least one objective lens positioned within the bore and along the first optical axis;
   a first reflective element disposed along the first optical axis, within a first distance from the convex surface and tilted at a first tilt angle, the first reflective element configured to reflect rays incident along the first optical axis onto a second optical axis; and
   a second reflective element disposed along the second optical axis and within a second distance from the concave surface,
   wherein the first tilt angle is selected such that the first and the second distances are minimized, and
   wherein the first reflective element is semi transparent.

8. An optical instrument comprising:
   an objective lens having an outer convex surface, an inner concave surface, a center, a first optical axis, and a bore cut substantially though the center;
   a set of at least one objective lens positioned within the bore and along the first optical axis;
   a first reflective element disposed along the first optical axis, within a first distance from the convex surface and tilted at a first tilt angle, the first reflective element configured to reflect rays incident along the first optical axis onto a second optical axis; and a second reflective element disposed along the second optical axis and within a second distance from the concave surface, wherein the first tilt angle is selected such that the first and the second distances are minimized, and wherein the first reflective element is reflective for a first range of wavelength and transparent for a second range of wavelength.

9. An optical instrument comprising:

a focusing objective lens having a first optical axis and a center bore;

a first set of objective lenses disposed downstream of the objective lens, along the first optical axis, and partially in the bore;

a first reflective element disposed downstream of the first set of lenses, on the first optical axis, partially in the bore, within a first distance from the objective lens, and at a tilt angle relative to the first optical axis, the first reflective element configured to reflect rays from the objective lens away from the first optical axis;

a pair of lenses downstream of the objective lens and on the optical axis, the pair of lenses directing unreflected rays from the objective lens to a first image plane;

a second reflective element that reflects the reflected rays along a second optical axis to a second image plane, wherein the first reflective element is closer to the objective lens than the second reflective element.

10. The optical instrument according to claim 9, wherein images received at the first and second image planes have a different wavelength ranges and are combinable into a single image exhibiting data derived from the different wavelength ranges.

11. The optical instrument according to claim 9, wherein the first reflective element is semi transparent.

12. The optical instrument according to claim 9, wherein the first reflective element is reflective for a first range of wavelength and transparent for a second range of wavelength.

13. The optical instrument according to claim 9, wherein the first reflective element is located partially within the bore.

14. The optical instrument according to claim 9, wherein the tilt angle is greater than 45° and smaller than 55°.

15. The optical instrument according to claim 9, wherein the tilt angle is approximately 50°.

16. An optical instrument comprising:

an objective lens having an outer convex surface, an inner concave surface, a center, a first optical axis, and a bore cut substantially though the center;

a set of at least one additional objective lenses positioned within the bore and along the first optical axis;

a first reflective element disposed along the first optical axis, within a first distance from the inner side of the convex surface such that the first reflective element is at least partially disposed within the concavity of the inner concave surface and tilted at a first tilt angle relative to the first optical axis such that rays coming through the set of at least one additional objective lenses are folded onto a second optical axis, the first reflective element configured to reflect rays incident along the first optical axis onto the second optical axis; and a second reflective element disposed along the second optical axis and within a second distance from the concave surface, wherein the first tilt angle, the first distance and the second distance are selected such that a modulation transfer function associated with the optical instrument is optimized such that the Sagittal and Meridional lines coincide.

\* \* \* \* \*